A. J. GOYETTE.
FRONT AXLE CONNECTION FOR VEHICLES.
APPLICATION FILED JULY 30, 1908.

934,067.

Patented Sept. 14, 1909.

WITNESSES:
H. H. Cutter.
J. M. Sterns.

INVENTOR.
Arthur J. Goyette.
BY Webster & Co.,
ATTORNEYS.

UNITED STATES PATENT OFFICE.

ARTHUR J. GOYETTE, OF SPRINGFIELD, MASSACHUSETTS, ASSIGNOR TO THOMAS E. DALY, OF SPRINGFIELD, MASSACHUSETTS.

FRONT-AXLE CONNECTION FOR VEHICLES.

934,067.  Specification of Letters Patent.  Patented Sept. 14, 1909.

Application filed July 30, 1908. Serial No. 446,048.

*To all whom it may concern:*

Be it known that I, ARTHUR J. GOYETTE, a citizen of the United States of America, residing at Springfield, in the county of Hampden and State of Massachusetts, have invented a new and useful Front-Axle Connection for Vehicles, of which the following is a specification.

My invention relates to improvements in devices applicable to vehicles for the purpose of enabling them to turn or to be turned, and consists essentially of certain peculiarly constructed members designed to connect the front axle members of a vehicle with the king-bolt thereof, as hereinafter set forth.

The object of my invention is to produce a connection of this kind which permits the front axle of a vehicle to which said invention is applied to turn and which at the same time throws the front end of the body of said vehicle over in the opposite direction to that taken by said axle, whereby the vehicle can be caused to make a much sharper or shorter turn in either direction than would otherwise be possible or practicable without providing front wheels small enough to cut under said body. As is well understood wheels so small as to be capable of being turned under the vehicle body are not generally desired. My device, while being particularly well adapted for what are known as drop-bottom carts or wagons, is equally well adapted for vehicles of the ordinary type.

A further object is to provide a front axle connection which is strong and durable yet simple and inexpensive.

I attain these objects by the means illustrated in the accompanying drawings, in which—

Figure 1:
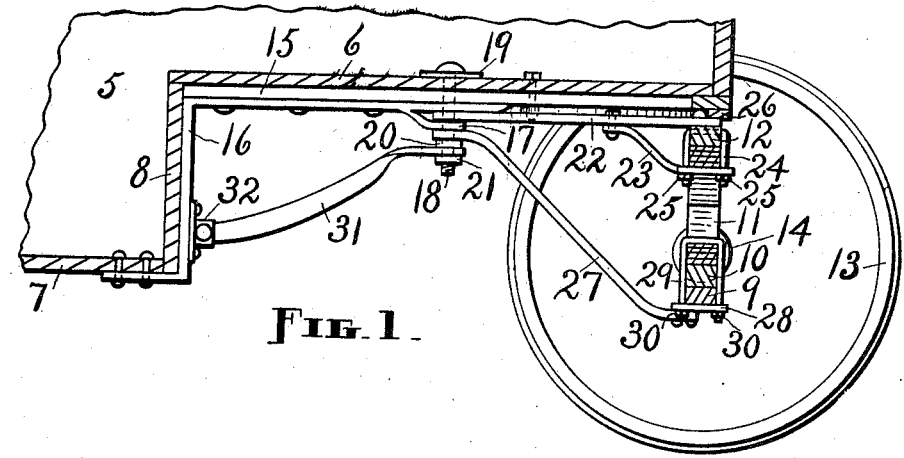
Figure 2:
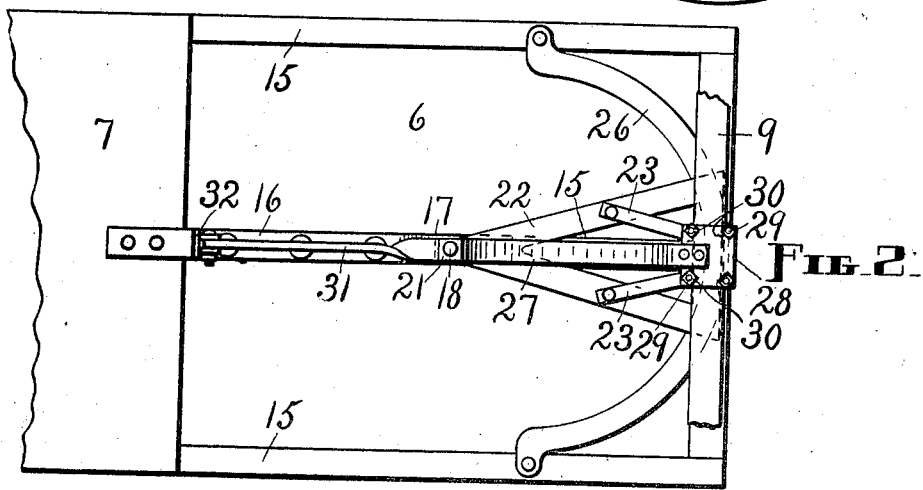
Figure 3:
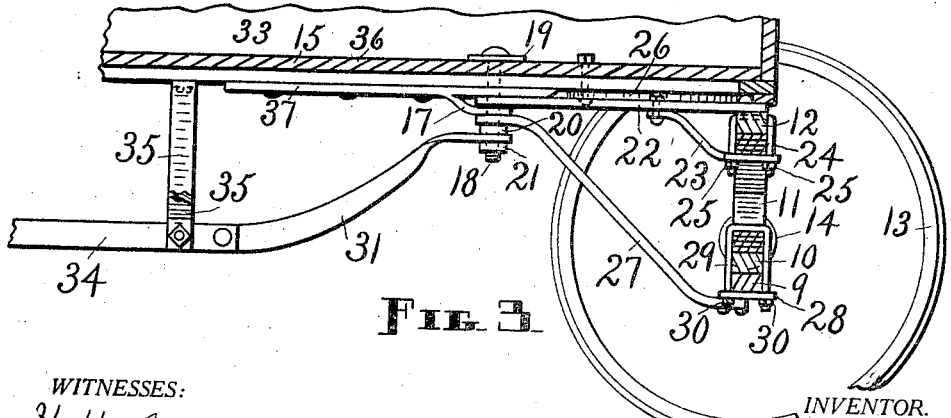

Figure 1 is a sectional view of the front part of the body of a drop-bottom cart and a cross-section of the front axle members of such cart having my invention embodied therewith; Fig. 2, a bottom view of the parts shown in the preceding view, all excepting the middle portions of the front axle members being broken off, and, Fig. 3, a similar view to Fig. 1 only that a portion of the body of an ordinary wagon is here represented in place of the drop-bottom variety.

Similar figures refer to similar parts throughout the several views.

Referring first to Figs. 1 and 2, it will be seen that I show a portion of a drop-bottom body 5, including the upper floor 6 at the front, a part of the lower floor 7, and the short front end 8. A front axle is represented at 9, such axle being of metal and having the usual wooden bar 10 thereon. Mounted on the bar 10 is a spring 11, and mounted on said spring is a bolster or block 12. The axle 9 necessarily curves upward between the middle portion and the parts which are received into the wheel hubs in order to accommodate wheels of the size required, the rim of one of such wheels appearing at 13 and its hub at 14. Underneath the floor 6 adjacent to the side edges thereof and in the center are three joists 15. The parts just pointed out are old and well-known. An angular bar 16, provided with a downwardly and forwardly projecting lip 17, is securely fastened to the middle joist 15 and to the floor 7. The lip 17 is located below the long horizontal arm of the bar 16 a short distance from the front end of the same. Vertically alining holes are made in the bar 16 and the lip 17 and in the middle joist 15 and the floor 6 above for a king-bolt 18, a washer 19 being introduced between the head of said bolt and said floor. The lower terminal of the king-bolt 18 is screw-threaded to receive nuts 20 and 21. The king-bolt 18 is situated some distance back of the front end of the body 5, approximately in the center of the floor 6 in the present instance.

A draw-bar 22 is rigidly attached to the block 12 and extends rearwardly to be received between the bar 16 and the lip 17 and to loosely engage the king-bolt 18. Preferably the draw-bar 22 is triangular in shape, the base of the triangle being riveted, screwed, or otherwise fastened to the block 12 and the apex of said triangle pivoting on the king-bolt. Braces 23—23, extending between the bottom of the upper half of the spring 11 and the arms of the draw-bar 22, may be provided to still further stiffen the connection between said bar and the axle members. The front end of each brace 23 is secured to the upper half of the spring 11 on the under side by means of a clip 24 and nuts 25—25, such clip passing over the block 12 in a transverse groove therein and then downward on both sides of said block and of said upper half of the spring, while the rear end of such brace is bolted or otherwise fastened to the corresponding or adjacent arm of the draw-bar. A shoe 26, generally in the form of an arc of a circle having the same center as that of the king-bolt 18 and usually consisting of metal, is fastened to the underside of the joists 15 to form the direct support for the front end of the body on the draw-bar 22. The base of the draw-bar and the shoe 26 are in rubbing contact whenever the axle 9 is turned, and at other times in stationary contact. An auxiliary draw-bar 27 connects the king-bolt 18 with the axle 9 below the draw-bar 22. The rear end of the draw-bar 27 loosely engages the king-bolt below the lip 17, and the front end of said draw-bar is riveted to a plate 28 which is held tightly against the bottom of the axle 9 by means of two clips 29 and the proper number of nuts 30.

From the foregoing it is plain that, owing to the fact that the two draw-bars are fixed to the front axle members while being free to swing on the king-bolt, the axle will turn on said king-bolt and will also throw the body of the cart over in the opposite direction, thus producing a comparatively quick turn of the vehicle and bringing the same around in almost if not quite as small a space as would be required in the event that the front wheels were sufficiently low to cut under.

In order to assist in holding the king-bolt 18 rigidly in place and to keep up the adjacent end of the auxiliary draw-bar 27 I provide the nuts 20 and 21 already mentioned, and a brace 31 which is secured at one end between said nuts to said king-bolt and at the other end to a bracket 32 riveted to the upright part of the bar 16. This brace stiffens the construction and adds strength to the same.

In the last view the front part of an ordinary wagon body is shown at 33, and the front terminal of a reach at 34. The reach 34 instead of being connected with the front axle, as is customary, has its forward end firmly supported by oblique braces 35—35 which depend from the floor 36 of the body 33, or by any other suitable means. Here the rear end of the brace 31 is fastened to the contiguous end of the reach 34, and a short bar 37 is used in place of the longer bar 16, such bar 37, however, being attached to the middle joist 15 in the same manner as the corresponding part of the bar 16 in the other case; otherwise, similar members are employed as before, and the operation is the same.

My invention can be applied to old as well as new vehicles.

Obviously it will be necessary to change the construction of my device in the matter of minor details so as to adapt the same to different vehicles, consequently I do not desire or intend to be restricted to the exact forms of my invention herein shown and described.

What I claim as my invention, and desire to secure by Letters Patent, is—

1. The combination, in a device of the class specified, with the body of a vehicle, the front axle members of such vehicle, and a king-bolt suitably supported at the top, of a draw-bar rigidly attached to such axle members and extending rearward directly under said body to rotatably engage such king-bolt, and an auxiliary draw-bar beneath and independent of said first-mentioned draw-bar, said auxiliary draw-bar having its front end rigidly attached to said axle members and its rear end rotatably engaged with said king-bolt, and a brace for said king-bolt, such brace having one end connected with the lower part of the king-bolt and the other end fastened to a fixed part of the vehicle.

2. The combination, in a device of the class specified, with the body of a vehicle, the front axle members of such vehicle, and a suitably supported king-bolt, of a draw-bar rigidly attached to such axle members and extending rearward directly under such body to rotatably engage such king-bolt, a shoe arranged on the bottom of said body to bear on such draw-bar, and an auxiliary draw-bar beneath and independent of said first-mentioned draw-bar, said auxiliary draw-bar having its front end rigidly attached to said axle members and its rear end rotatably engaged with said king-bolt.

3. The combination, in a device of the class specified, with the body of a vehicle, the front axle members of such vehicle, a king-bolt, and a perforated bar provided with a perforated lip attached beneath such body to receive and support such king-bolt, of a draw-bar rigidly attached to such axle members and extending rearward directly under said body to rotatably engage said king-bolt between the aforesaid bar and lip, and an auxiliary draw-bar below said first-mentioned draw-bar, said auxiliary draw-bar having its front end rigidly attached to said axle members at a point remote from the place of attachment of said first-mentioned draw-bar to the axle members and its rear end rotatably engaged with the king-bolt below said lip.

4. The combination, in a device of the class specified, with the body of a vehicle, and the front axle members of such vehicle, of a king-bolt, a supporting bar and lip for such king-bolt, such bar being fastened beneath such body, a brace for such king-bolt, and two independent draw-bars pivotally connected with said bar and said brace by means of said king-bolt and rigidly attached to said axle members.

5. The combination, in a device of the class specified, with the body of a vehicle, and the front axle members of such vehicle, of a king-bolt, a supporting bar and lip for such king-bolt, such bar being fastened beneath such body, two independent draw-bars each having one end pivotally connected with said body and said bar by means of said king-bolt and the other end rigidly attached to said axle members, and a brace having one end fastened to a fixed part of the vehicle and the other end fastened to the king-bolt.

6. The combination, in a device of the class specified, with the body of a vehicle, and the front axle members of such vehicle, of a king-bolt, a supporting bar and lip for such king-bolt, such bar being fastened beneath such body, a draw-bar engaging at one end such king-bolt between said bar and lip and being fastened at the other end to such axle members, an auxiliary draw-bar engaging at one end such king-bolt below said lip and being fastened at the other end to such axle members, a nut on said king-bolt below the engaging terminal of said auxiliary draw-bar, a brace having one end in engagement with the king-bolt below said nut and the other end fastened to a fixed part of the vehicle, and a second nut on the king-bolt below the engaging terminal of said brace.

ARTHUR J. GOYETTE.

Witnesses:
F. A. CUTTER,
S. S. TAFT.